United States Patent [19]

Culp

[11] Patent Number: 4,522,336
[45] Date of Patent: Jun. 11, 1985

[54] ADAPTIVE OPTIMUM START/STOP CONTROL SYSTEM

[75] Inventor: Charles H. Culp, Vernon Hills, Ill.

[73] Assignee: Honeywell Inc., Minneapolis, Minn.

[21] Appl. No.: 448,148

[22] Filed: Dec. 9, 1982

[51] Int. Cl.³ .............................................. G05D 23/00
[52] U.S. Cl. .................................... 236/46 R; 236/47; 364/148
[58] Field of Search ............... 236/46 R, 4 T; 165/12; 62/231; 364/148, 152

[56] References Cited

U.S. PATENT DOCUMENTS

| | | | |
|---|---|---|---|
| 3,996,452 | 12/1976 | Schulze et al. | 364/148 |
| 4,236,218 | 11/1980 | Killebrew et al. | 364/152 X |
| 4,335,847 | 1/1982 | Levine | 236/46 R |
| 4,356,962 | 11/1982 | Levine | 165/12 X |
| 4,386,397 | 5/1983 | Saeki | 364/148 |
| 4,408,711 | 10/1983 | Levine | 165/12 X |
| 4,410,132 | 10/1983 | Levine | 364/148 X |

FOREIGN PATENT DOCUMENTS 2065334 10/1979 United Kingdom .

OTHER PUBLICATIONS

Dictionary of Automatic Control; Bibbero, 10/1961, TJ 215.5 B5 C.2.
Microprocessors for Building Services, Lush 1/1981, Electronics & Power.

Primary Examiner—William E. Wayner
Attorney, Agent, or Firm—Trevor B. Joike

[57] ABSTRACT

An adaptive optimum start/stop controller for controlling an air treatment apparatus at a reduced energy consuming level during periods of non-occupancy of a building and for energizing the air treatment apparatus before occupancy so that the building is comfortable by occupancy, the controller including a temperature sensor for sensing space temperature within the building, a controller responsive to the temperature sensor and to real time for determining optimum start/stop times so that the building is controlled at energy conservation levels during non-occupancy and comfortable levels during occupancy, the controller adjusting the optimum start/stop times based upon the accuracy of prior start/stop times, and a communication channel for connecting the controller to the air treatment apparatus.

12 Claims, 3 Drawing Figures

ADAPTIVE OPTIMUM START/STOP CONTROL SYSTEM

BACKGROUND OF THE INVENTION

The present invention relates to a system for optimally starting and stopping air treatment within a building so that the building can be controlled during non-occupancy times at a level requiring minimum energy consumption and, more particularly, to a system which is adaptive so that the optimum stop and/or start times are adjusted based upon the accuracy of prior start/stop times.

Present building control systems, whether for very large buildings or for very small buildings, are primarily concerned with conserving energy. It is the primary objective of these systems to reduce the energy consumption of a building to the lowest possible level. One of the most important energy conserving practices today is the setback of the indoor temperature of a building during non-occupancy hours. During the winter months, this setback practice involves lowering the setpoint of the indoor temperature so that the heating system will not run as much during periods of non-occupancy and, therefore, requires less energy consumption. During summer months, setback means raising the indoor setpoint temperature so that the air conditioning system is not required to run as much during non-occupancy hours and, therefore, requires less energy consumption than is required during occupancy hours.

In order for the building to be comfortable by the beginning of an occupancy period, previous systems have determined at what time the air treatment system, whether it is an air heating furnace or an air conditioning chiller system, must be turned on prior to the beginning of occupancy in order to bring the indoor temperature to the desired occupied setpoint temperature. Typically, the amount of time that the air treatment system is energized prior to the beginning of occupancy has been determined by the outdoor air temperature. During the winter, if the outdoor air temperature is cold, then the amount of time required to bring the indoor temperature to the desired setpoint is long, and if the outdoor temperature is warmer, the amount of time is shorter.

Conversely, energy can be saved by stopping the air treatment equipment for a time prior to the period of non-occupancy so that the inside space temperature drifts to the minimum established comfort level at the time non-occupancy begins and thereafter controlling the air treatment equipment at the night setback temperature. This operation is termed optimum stop. Again, the amount of time prior to the period of non-occupancy that the air treatment equipment can be deenergized is a function historically of outdoor temperature.

Although most of these prior art systems wherein the amount of start up time before occupancy and stop time before non-occupancy required to maintain a comfort level during occupancy and a setback level during non-occupancy have been based upon outdoor temperature, there have been attempts to use space temperature as the basis for determining these start and stop times. In such a system, the rate of change of the temperature during periods of occupancy and non-occupancy have been used in order to determine optimum start and stop times. However, such systems are not adaptive. There are many factors other than outdoor temperature and/or rate of temperature change within the building which may impact optimum start and stop times.

SUMMARY OF THE INVENTION

Therefore, in order for an optimum start/stop time system to accurately predict start and stop times, the system should be adaptive, i.e. start and stop times should be adjusted based upon past history and actual experience. Accordingly, the present invention involves an adaptive optimum start/stop controller for controlling an air treatment apparatus at a reduced energy consuming level during periods of non-occupancy of a building and for energizing the air treatment apparatus before occupancy so that the building is comfortable by occupancy. The controller includes a temperature sensing device for sensing space temperature within the building, a controller responsive to the temperature sensing device and to real time for determining optimum start/stop times so that the building is controlled at energy conservation levels during non-occupancy and comfortable levels during periods of occupancy, the controller adjusting the optimum start/stop times based upon the accuracy of start/stop times, and a connection system for connecting the controller to the air treatment apparatus.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
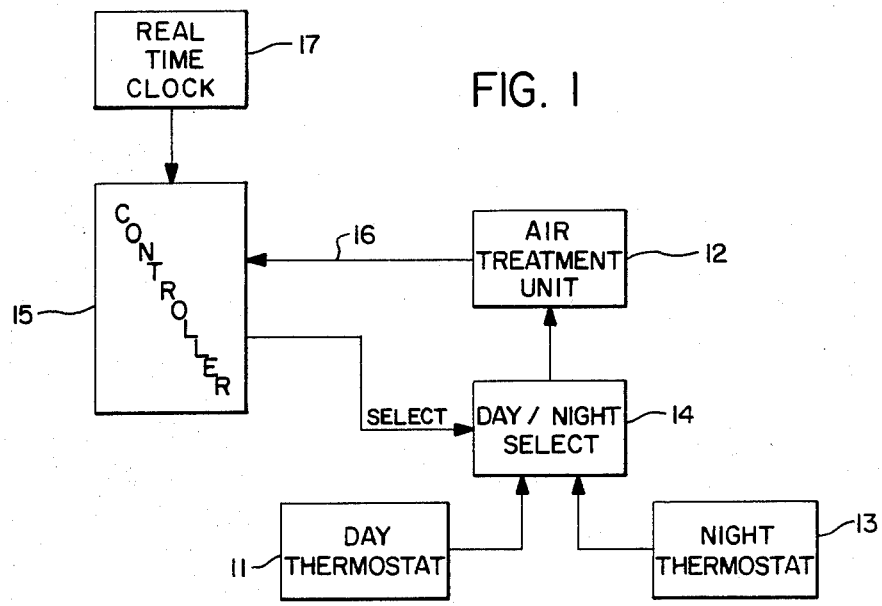
FIG. 1 shows one system which provides adaptive start/stop optimized control.

The first step in controlling the optimum start/stop times according to the present invention involves the measurement of the rate of change of the temperature within the building during periods of non-occupancy and/or occupancy. In FIG. 1, the controller senses the on and off status of the air treatment unit or apparatus, can determine how long the air treatment apparatus is on or off during any given period of time, and retains in memory the hysteresis involved in the particular thermostat which is controlling the air treatment apparatus. Knowing the temperature hysteresis, that is the difference in the temperature at which the air treatment unit is energized and deenergized, divided by the amount of time required for the air treatment unit to drive the thermostat through its hysteresis, provides the rate of temperature change within the building.

Thus, in FIG. 1, day thermostat 11 is designed to control the air treatment unit 12 during periods of occupancy and night thermostat 13 is designed to control the air treatment 12 during periods of non-occupancy. Either thermostat 11 or thermostat 13 is connected to air treatment unit 12 by way of a day/night selector 14 under control of controller 15. Controller 15 by line 16 can sense when the air treatment unit 12 is on or off. The detection of the amount of time that air treatment unit 12 is on and/or off is based upon real time and, therefore, controller 15 is connected to real time clock 17.

Controller 15 has stored in its memory the hysteresis of thermostats 11 and 13. Thus, if controller 15 knows the hysteresis of thermostat 13 and it detects the amount of time required for the air treatment unit 12 to drive the thermostat through its hysteresis during the nighttime hours, then controller 15 can determine the rate of temperature change during the non-occupied period. In this manner, controller 15 is responsive to temperature sensors 11 and 13. Using the rate of temperature change during the period of non-occupancy, controller 15 can predict how much time will be required prior to the beginning of occupancy in order to bring the nighttime setback temperature to the daytime temperature. Controller 15 will then through switch 14 connect thermostat 11 to air treatment 12 that determined period of time before the beginning of occupancy so that air treatment unit 12 can bring the space temperature within the building to the day temperature just at the beginning of occupancy so that those occupying the building will be comfortable. Similarly, the optimum stop time can be determined by sensing the rate of temperature decay during periods of occupancy.

Figure 2:
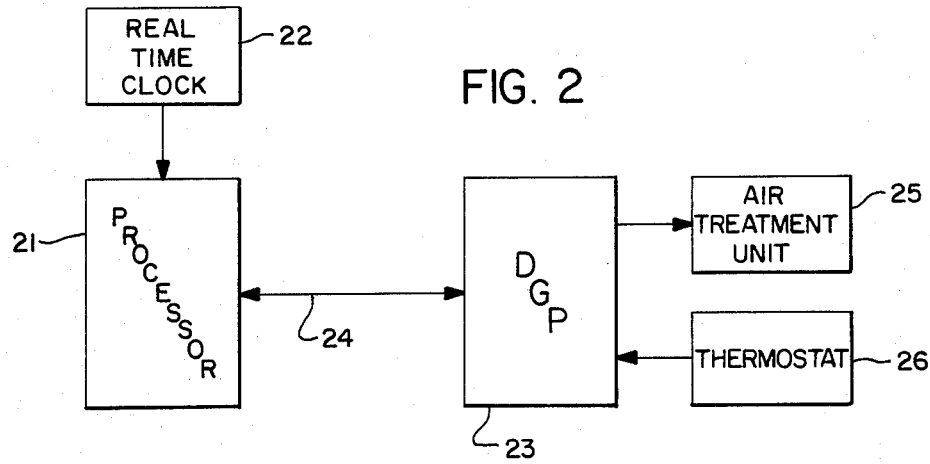
FIG. 2 shows another system which provides adaptive start/stop optimized control; and, FIG. 3 shows a flow chart of the system operation for the systems shown in FIGS. 1 and 2.

FIG. 2 shows an alternative system for accomplishing the same result. The system shown in FIG. 2 can be a Delta system such as any of the Delta systems manufactured by Honeywell Inc. Such a system involves a processor 21 connected to real time clock 22 and connected to various data gathering panels only one of which 23 is shown in FIG. 2. The connection from processor 21 to data gathering panel 23 is made by way of cable 24. Connected as an output to data gathering 23 is air treatment unit 25 and connected as an input to data gathering panel 23 is thermostat 26.

By using digital communication techniques, processor 21 can read the on and off status or the analog status of thermostat 26 and can by using the temperature differential and real time clock 22 determine the rate of temperature increase or decrease.

Instead of using the hysteresis of the thermostat to air in the calculation of the rate of temperature change, processor 21 can turn air treatment unit 25 on for a predetermined amount of time and measure the temperature change. Thus, instead of a fixed temperature change in a variable amount of time for determining the rate of temperature change, a variable temperature change over a fixed amount of time can be used for determining the rate of temperature change within the building.

As an alternative to the system shown in FIGS. 1 and 2, the present invention can be used with a stand-alone thermostat where the real time clock, the processor and the data gathering function are integral. In such a thermostat, the temperature measuring device and the control output may or may not be integral with these other elements.

Figure 3:
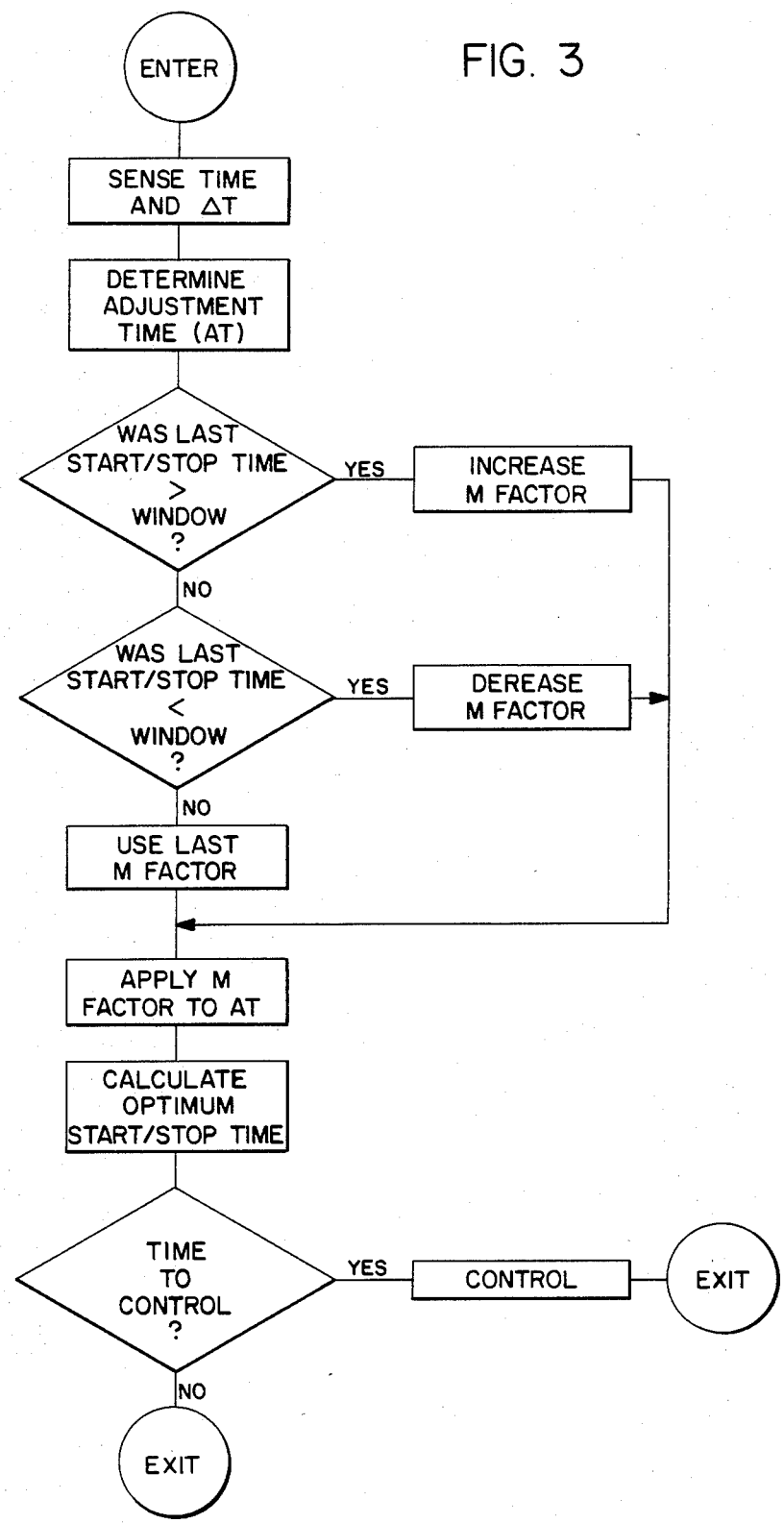

The particular system used for determining the rate of temperature change is not as important as the fact that the rate of temperature change within the building during periods of non-occupancy and/or occupancy must be determined. Whichever system is used, the flow chart of FIG. 3 shows how the system can use the various parameters for controlling the optimum start times of an air treatment apparatus or unit. The routine is periodically entered with a period selected by the user.

The first operation is to sense time and temperature differences according to the above discussion in order to determine the rate of temperature change. As mentioned previously, this operation may involve measuring the time differential required to drive a thermostat through its hysteresis (i.e. the off and on temperatures of the thermostat) or may involve turning on the air treatment unit for a predetermined amount of time and measure the temperature change, or a combination of any of the above, or any similar operation. Change in temperature divided by change in time will yield the rate of temperature change of the building.

The next operation is to determine the adjustment time which is defined as the amount of time prior to occupancy in the case of optimum start or prior to non-occupancy in the case of optimum stop during which the air treatment apparatus must be energized for optimum start to bring the temperature to a comfortable level for occupancy or during optimum stop to deenergize the air treatment unit so that the temperature within the space can drift to the night setback temperature.

During the winter season, the adjustment time can be given by the following equation:

$$AT = \frac{T_{CMIN} - T_{SETBACK}}{\text{Rate Increase}} \quad (1)$$

where $T_{CMIN}$ is the minimum comfort temperature, i.e. the lower temperature in the comfort range, $T_{SETBACK}$ is the setback or nighttime temperature, and Rate Increase is the rate of temperature increase calculated as indicated above during non-occupancy. $T_{CMIN}$ is chosen because it is assumed for the building that the air treatment apparatus is not energized as long as the space temperature within the building is somewhere between minimum and maximum comfort temperature levels, defined as the comfort range. For example, during winter months, this range may be 65° to 75° F. On the other hand, if a comfort range is not used, then $T_{CMIN}$ becomes the daytime setpoint temperature. In any event, the adjustment temperature AT can be determined by equation 1.

For optimum stop, the adjustment time for turning off the air treatment apparatus prior to the beginning of the non-occupied period, can be determined from an equation similar to equation 1. In this case, however, the minimum comfort temperature which is permissible at the end of the occupancy period is substituted for the setback temperature in equation 1 and the present existing temperature is substituted for $T_{CMIN}$. Rate decrease is then used instead of rate increase by determining the temperature drop within the building during a period of time when the air treatment apparatus is deenergized.

For summer operation, the equation for determining the adjustment time is as follows:

$$AT = \frac{T_{SETBACK} - T_{MAX}}{\text{Rate Decrease}} \quad (2)$$

where $T_{SETBACK}$ is the setback temperature during night, that is the elevated temperature within the period during non-occupancy, $T_{CMAX}$ is the maximum temperature of the comfort range, and Rate Decrease is the rate of temperature decrease as determined during periods of non-occupancy. This equation 2 is used then to determine optimum starts during summer months when the air treatment apparatus is cooling the building. Similar adjustments in the formula must be made in order to determine optimum stop.

The adjustment time can then merely be subtracted from the time at which occupancy is to begin during optimum start operation or the time at which occupancy is to end for optimum stop operation. However, this system does not take into account variations in the building and in the control system which may influence the adjustment temperature and may cause errors in the calculation of the optimum start/stop time. In other words, this system is not adaptive. Thus, for optimum starts, the equation 1, during winter months, can be written as follows in order to determine the optimum start time:

$$\text{Start Time} = \text{Occupancy} - M \cdot AT \quad (3)$$

where Start Time is the optimum start time for beginning the warm up of the building so that it will be comfortably warm at the beginning of occupancy, Occupancy is the time at which occupancy of the building is to begin, M is an adjustment factor based upon the accuracy of prior start/stop times, and AT is the adjustment time. The optimum stop time may be calculated according to the following equation:

$$\text{Stop Time} = \text{Non-Occupancy} - M \cdot AT \quad (4)$$

The controller or processor has programmed therein a window of success such that the M factor is not adjusted as long as the temperature of the building is at its correct level within a predetermined amount of time of (a) the beginning of occupancy in the case of optimum start and (b) the beginning of non-occupancy in the case of optimum stop. For example, if during optimum start operation the building is to be occupied at 8:00 am, a window which is plus or minus 10 minutes around 8:00 am is established. Thus, if the air treatment apparatus is energized a period of time before 8:00 am in order to bring the temperature up to the desired daytime temperature at 8:00 am and if, in fact, the temperature is raised to the desired daytime temperature within this 20 minute window centered around 8:00 am, the M factor will not be adjusted. Of course, this window can be of any desired length and can be positioned with respect to the beginning of occupancy in any desired manner.

As shown in FIG. 3, after the adjustment time is determined, the controller will then determine whether or not the last start/stop time resulted in the temperature being brought to the desired temperature at a time that went beyond the window, e.g. in the above example at 8:20. If so, then the air treatment apparatus in the case of optimum start was not energized soon enough before occupancy to bring the temperature up to the desired temperature level at a time that fell within the window. Thus, the M factor must be increased to increase the adjustment time in order to provide enough time for the air treatment apparatus to bring the temperature to the desired level.

If, however, the last start/stop time did not result in the space temperature being brought to the desired temperature beyond the window, it must next be determined whether or not that last start/stop time resulted in the space temperature being brought to the desired temperature at a time which fell short of the window. For example, at 7:40 instead of within the window. If so, the air treatment apparatus was energized too soon since it brought the space temperature up to the desired temperature too much before the occupancy period in the case of optimum start. In this case, the M factor must be decreased in order to reduce the adjustment time accordingly.

If, however, the last start/stop time resulted in the temperature being raised to the desired temperature within the window, then the last M factor is used.

As an example, when the system is originally set up for operation, the M factor can be set at 1. If the following day the air treatment apparatus raises the space temperature to the desired temperature at a point in time before the window surrounding the beginning of occupancy, the M factor can be decreased by 0.1 to 0.9. Three situations can then occur on the following day. If during the following morning, the air treatment apparatus brings the temperature of the space up to the desired temperature again earlier than the window, then the M factor can be reduced again by 0.1 to 0.8. On the other hand, if the air treatment apparatus brings the space temperature up to the desired temperature at a time which falls within the window, the M factor is not adjusted and the last M factor, 0.9, can be used. Finally, if the air treatment apparatus brings the space temperature up to the desired temperature at a time which falls beyond the window, then the M factor can be increased by 0.1 to 1. It is clear that other methods of adjusting the M factor can be used such as using a percentage change, a weighted change based upon the accuracy of calculations and the like.

Again as shown in FIG. 3, once the M factor is determined, it is applied to the adjustment time as shown in equations 3 and 4 and is used then to calculate the optimum start/stop time. The controller will then determine whether or not there is coincidence between the real time and the calculated optimum start/stop time. If so, the appropriate control action is taken and the system exits to wait the predetermined period of time before reentering the routine shown in FIG. 3. If it is not time to control, then the system simply exits and waits to reenter.

Instead of adjusting the M factor as indicated above, the M factor can be adjusted proportionally to the difference in the scheduled occupancy time and the actual start time for optimum start operation and the difference between the scheduled non-occupancy time and the actual stop time during optimum stop operation.

Thus, the M factor calculation will help to offset non-linearities in the heat/cooling cycle or any measuring inaccuracies. This system allows for no operator intervention to adjust time constants. The device will "learn" the building and thus be adaptive.

Although the M factor is adjusted based upon past experience, the M factor can be adjusted as soon as the processor can determine the proper corrective action. For example, if the temperature is brought to the desired level at a time later than the window, the processor can adjust the M factor immediately and not wait for the next period. Thus, for purposes of the present invention, "prior start/stop times" means that the M factor is adjusted at some time before the next start or stop period is entered whether that time is immediately after the accuracy of the latest start/stop time is known, just before the next start/stop period is entered or the like.

The embodiments of the invention in which an exclusive property or right is claimed are defined as follows:

1. An adaptive optimum start/stop controller for controlling an air treatment apparatus at a reduced energy consuming level during periods of non-occupancy of a building and for energizing the air treatment apparatus before occupancy so that the building is comfortable by occupancy, said controller comprising:

temperature sensing means for sensing space temperature within said building;
   controller means responsive to said temperature sensing means and to real time for determining optimum start/stop times so that said building is controlled at energy conservation levels during non-occupancy and comfortable levels during occupancy, said controller means adjusting said optimum start/stop times based upon whether space temperature attained a desired temperature during a prior start/stop operation within an accuracy window of time encompassing the start of a corresponding prior occupancy/non-occupancy period; and,
   communication means adapted to connect said controller means to said air treatment apparatus.

2. The controller of claim 1 wherein said controller means comprises means for adjusting said optimum start/stop times by a factor which varies dependent upon the deviation between said window and an actual corresponding time when said space temperature within said building reached said desired temperature during said prior start/stop operation.

3. The controller of claim 2 wherein said controller means comprises means for increasing said factor if said space temperature reaches the desired temperature later than said window.

4. The controller of claim 3 wherein said controller means comprises means for decreasing said factor if said space temperature reaches the desired temperature before said window.

5. An adaptive optimum start controller for controlling an air treatment apparatus at a reduced energy consuming level during periods of non-occupancy of a building and for energizing the air treatment apparatus at start times before occupancy so that the building is made comfortable by occupancy, said controller comprising:

temperature sensing means for sensing space temperature within said building;
   controller means responsive to said temperature sensing means and to real time for determining optimum start times so that said building is controlled at a reduced energy consuming level during non-occupancy and at a comfortable level during occupancy, said controller means adjusting said optimum start times based upon whether space temperature attained a desired temperature during a prior start operation within an accuracy window of time encompassing the start of a corresponding prior occupancy period; and,
   communication means adapted to connect said controller means to said air treatment apparatus.

6. The controller of claim 5 wherein said controller means comprises means for adjusting said optimum start times by a factor which varies dependent upon the deviation between said window and an actual corresponding time when said space temperature within said building reached said desired temperature during said prior start operation.

7. The controller of claim 6 wherein said controller means comprises means for increasing said factor if said space temperature reaches the desired temperature later than said window.

8. The controller of claim 7 wherein said controller means comprises means for decreasing said factor if said space temperature reaches the desired temperature before said window.

9. A method for controlling an air treatment apparatus at a reduced energy consuming level during periods of non-occupancy of a building and for energizing the air treatment apparatus at start times before occupancy so that the building is made comfortable by occupancy, the method comprising the steps of:

sensing space temperature within said building;
   determining rate of temperature change based upon the sensed temperature and real time which is required by the air treatment apparatus to drive the temperature of the building through a temperature change;
   determining adjustment time based upon the rate of temperature change and the difference between actual temperature during setback and desired temperature at beginning of occupancy;
   providing an accuracy window of time around the beginning of occupancy;
   adjusting the adjustment time based upon whether space temperature attained a desired temperature during a prior start operation within said accuracy window of time encompassing the start of a corresponding prior occupancy period; and,
   initiating operation of the air treatment means at a time defined by the beginning of occupancy less the adjusted adjustment time.

10. The method of claim 9 wherein said step of adjusting the adjustment time comprises the steps of applying a factor to the adjustment time, the factor varying dependent upon the deviation between the actual time at which space temperature is brought to said desired level and said window of time.

11. The method of claim 10 wherein the step of adjusting the adjustment time based upon the accuracy of prior adjustment times comprises the step of increasing the factor if the time at which the space temperature is brought to the desired level falls later than the window.

12. The method of claim 11 wherein said step of adjusting the adjustment time based upon the accuracy of prior adjustment times comprises the step of decreasing the factor if, during the previous start operation, the space temperature is brought to the desired level earlier than the window.

* * * * *